Patented June 25, 1946

2,402,690

UNITED STATES PATENT OFFICE 2,402,690

PROCESS FOR MAKING MARGARINE

Joseph Stanley, Chicago, Ill., assignor to American Lecithin Company, Cleveland, Ohio, a corporation of Ohio No Drawing. Application November 6, 1941, Serial No. 417,994

10 Claims. (Cl. 99—123)

This invention relates to a process of making margarine and the emulsifiers to be used therein in the form of a novel imbibition.

Good margarine should be of fine texture, show no bleeding of the aqueous phase, and it should not spatter when heated as for example in frying. Various emulsifiers have been proposed to impart these and other advantages to margarine including lecithin rich materials, and esters of polyhydric alcohols and higher fatty acids containing at least one free alcohol hydroxyl group. For example, soybean lecithin, and glyceryl monostearate are frequently employed in margarine to secure among other advantages improvements in texture, water retention, and anti-spattering properties.

However, the form in which these emulsifiers are added, the way they are added, and the point in the process at which they are added have a great bearing on their efficacy to accomplish the ends desired. Those skilled in the art are aware that a given emulsifier in margarine will have different effects depending on whether said emulsifier is dispersed in the aqueous, oil, or mixed phases.

A common practice is to disperse the emulsifiers in the warm oils before adding the aqueous phase. A still better process is to disperse the emulsifiers in the mixed oil and aqueous phases and then chill and form the margarine into prints in the usual way. In using emulsifiers like lecithin and mono- or di-glycerides in margarine it has been found of advantage to disperse these emulsifiers in about an equal weight of edible oil, and then to add 5% to 10% of boiling water to form an imbibition. Such a percentage of water does not separate from the oil mixture, but apparently appears to dissolve in the oil. In reality the water is taken up by the dissolved lecithin and monoglyceride to form an imbibition. This mixture of emulsifiers with water is then added to the margarine at any stage in its processing. For example, it may be added to oils, the aqueous phase, or to the mixture of oils and aqueous phase. It may even be added to the margarine after chilling in a suitable blender.

The imbibition of water is formed when the lecithin is present alone, when the monoglyceride is present alone, or when the lecithin and monoglyceride are present together. I do not restrict myself to water in making such an imbibition, but may use any suitable edible solvent such as ethyl alcohol, glycerine, or even a mixture of such edible solvents. Other edible solvents capable of being imbibed by the dispersion may also be employed.

When such an imbibition is used in margarine in the usual proportions, namely in concentrations up to 2% of emulsifiers, it is found that the emulsifiers have an improved effect in the finished product. For example, the margarine has better moisture retaining properties, better anti-spattering properties, and better smoothness and texture. The imbibition itself is non-deteriorating and readily dispersible making it easier to use. Frequently an economy in the emulsifier content may be effected by using it in the form of an imbibition as hereinbefore described.

As an example, a typical margarine product is made by blending edible oils, cultured skim milk, and salt in a churn at a temperature of about 115° F. Enough of the following imbibition is then added to get an emulsifier concentration in the margarine of between 0.05% and 2%:

| | Pounds |
|---|---|
| Lecithin | 150 |
| Monostearate | 100 |
| Cottonseed oil | 215 |
| Water | 35 |
| Total | 500 | after mixing an appropriate period of time, the margarine is chilled, and printed in the usual way.

By lecithin I comprehend the use of any vegetable, animal, or synthetic phosphatide. In place of monostearate I may use any partial ester of a polyhydric alcohol and a higher fatty acid containing at least one alcoholic hydroxyl group in the alcohol part of the molecule.

In forming the imbibition I may use a solution of salt (NaCl) or sodium benzoate instead of water, or even a solution of these salts in cultured skim milk.

Having described the invention, what is claimed is:

1. A process for producing an improved margarine which comprises incorporating therein at any stage in the process of manufacture an aqueous imbibition comprising phosphatide.

2. A process for producing an improved margarine which comprises incorporating therein at any stage in the process of manufacture an aqueous imbibition comprising a partial ester of a polyhydric alcohol and a higher fatty acid containing at least one free hydroxyl group in the alcohol part of the molecule.

3. A process for producing margarine of improved smoothness and texture, and improved anti-spatter and anti-leak properties which comprises incorporating therein at any stage in the process of manufacture an aqueous imbibition of vegetable phosphatide and monoglyceride dispersed in edible oil.

4. A process for producing an improved margarine product of better smoothness and texture, and better anti-spatter and anti-leak properties which comprises incorporating therein at any stage in the process of manufacture a mixture of soybean phosphatide, diglyceride, and edible oil, in which is dispersed from 5% to 10% of water to form an imbibition.

5. A process for producing an improved margarine which contains up to 2% of phosphatide, and an ester of a polyhydric alcohol and a higher fatty acid containing at least one free hydroxyl group in the alcohol part of the molecule which comprises adding said phosphatide and said ester to the margarine at any stage in the process of manufacture, dissolved in about an equal weight of edible oil and containing 5% to 10% of imbibed water.

6. A process for producing an improved margarine which comprises incorporating therein at any stage in the process of manufacture an edible solvent imbibition of a phosphatide and a partial ester of a polyhydric alcohol and a fatty acid containing at least one free hydroxyl group in the alcohol part of the molecule dispersed in edible oil.

7. A process for producing a margarine product of improved anti-spatter and anti-leak properties comprising adding thereto at any stage in the process of manufacture a small percentage of a solvent imbibition of an ester of a polyhydric alcohol and a higher fatty acid containing at least one hydroxyl group in the alcohol part of the molecule, dispersed in several times its weight of edible oil, said solvent being selected from the class consisting of water, ethyl alcohol and glycerine.

8. A process for producing an improved margarine which comprises incorporating therein at any stage of the process an edible solvent imbibition of phosphatide dispersed in edible oil.

9. A process for producing a margarine product of improved anti-spatter and anti-leak properties comprising adding thereto at any stage in the process of manufacture a small percentage of an edible solvent imbibition of phosphatide dispersed in several times its weight of edible oil, said solvent being selected from the class consisting of water, ethyl alcohol and glycerine.

10. A process for producing an improved margarine which comprises incorporating therein at any stage of the process of manufacture an edible solvent imbibition of a margarine emulsifier selected from the class consisting of phosphatides and partial esters of a polyhydric alcohol and a higher fatty acid containing at least one free hydroxyl group in the alcohol part of the molecule.

JOSEPH STANLEY.